(12) United States Patent
Hukkeri

(10) Patent No.: US 8,751,103 B2
(45) Date of Patent: Jun. 10, 2014

(54) OBJECT DETECTION SYSTEM HAVING INTERFERENCE AVOIDANCE STRATEGY

(75) Inventor: Ramadev Burigsay Hukkeri, Pittsburgh, PA (US)

(73) Assignee: Caterpillar Inc., Peoria, IL (US)

(*) Notice: Subject to any disclaimer, the term of this patent is extended or adjusted under 35 U.S.C. 154(b) by 727 days.

(21) Appl. No.: 12/951,547

(22) Filed: Nov. 22, 2010

(65) Prior Publication Data
US 2012/0130588 A1  May 24, 2012

(51) Int. Cl.
*G06F 7/00* (2006.01)

(52) U.S. Cl.
USPC ............ 701/36; 701/25; 701/49; 701/301; 701/448

(58) Field of Classification Search
USPC ........... 701/25, 36, 49, 50, 448, 301; 356/603
See application file for complete search history.

(56) References Cited

U.S. PATENT DOCUMENTS

| | | | |
|---|---|---|---|
| 5,040,116 A | 8/1991 | Evans, Jr. et al. | |
| 5,210,586 A | 5/1993 | Grage et al. | |
| 6,152,588 A * | 11/2000 | Scifres | 362/496 |
| 6,286,607 B1 * | 9/2001 | Ohtomo et al. | 172/4.5 |
| 6,443,235 B1 * | 9/2002 | Ohtomo et al. | 172/4.5 |
| 6,491,420 B1 * | 12/2002 | Scifres | 362/553 |
| 6,665,433 B2 | 12/2003 | Roder | |
| 7,650,239 B2 * | 1/2010 | Samukawa et al. | 701/300 |
| 8,209,143 B1 | 6/2012 | Anguelov et al. | |
| 8,238,008 B2 * | 8/2012 | Talbot et al. | 359/198.1 |
| 2002/0108761 A1 * | 8/2002 | Ohtomo et al. | 172/4.5 |
| 2003/0137658 A1 * | 7/2003 | Ohtomo et al. | 356/141.4 |
| 2003/0174054 A1 * | 9/2003 | Shimomura | 340/435 |
| 2005/0125121 A1 * | 6/2005 | Isaji et al. | 701/36 |
| 2006/0025888 A1 | 2/2006 | Gutmann et al. | |
| 2006/0103927 A1 * | 5/2006 | Samukawa et al. | 359/436 |
| 2007/0027612 A1 * | 2/2007 | Barfoot et al. | 701/117 |
| 2008/0007707 A1 * | 1/2008 | Kim | 356/4.01 |
| 2008/0009966 A1 | 1/2008 | Bruemmer et al. | |

(Continued)

FOREIGN PATENT DOCUMENTS

| | | | |
|---|---|---|---|
| JP | 06-325298 | 11/1994 | |
| WO | WO 2009145695 A1 * | 12/2009 | G01C 21/30 |

OTHER PUBLICATIONS

U.S. Patent Application of Ramadev Burigsay Hukkeri entitled "Object Detection System Having Adjustable Focus", filed on Nov. 22, 2010.

*Primary Examiner* — Khoi Tran
*Assistant Examiner* — Jorge Peche
(74) *Attorney, Agent, or Firm* — Finnegan, Henderson, Farabow, Garrett & Dunner LLP

(57) ABSTRACT

An object detection system for a first machine is disclosed. The object detection system may have at least one transmitter configured to generate a laser beam directed onto a ground surface in proximity to the first machine, and a receiver configured to detect the laser beam and generate a corresponding signal. The object detection system may also have a controller in communication with the at least one transmitter and the receiver. The controller may be configured to generate an electronic terrain map based on the signal. The controller may also be configured to make a determination that a second machine is operating within a range of the first machine, and to adjust operation of the at least one transmitter and receiver based on the determination to reduce undesired interactions caused by operation of the second machine.

13 Claims, 4 Drawing Sheets

(56) References Cited

U.S. PATENT DOCUMENTS

| | | |
|---|---|---|
| 2008/0273791 A1 | 11/2008 | Lee et al. |
| 2009/0243889 A1* | 10/2009 | Suhr et al. ................. 340/932.2 |
| 2009/0252380 A1* | 10/2009 | Shimizu ....................... 382/107 |
| 2011/0066313 A1* | 3/2011 | Larsson et al. ................. 701/25 |

* cited by examiner

US 8,751,103 B2

OBJECT DETECTION SYSTEM HAVING INTERFERENCE AVOIDANCE STRATEGY

TECHNICAL FIELD

The present disclosure relates generally to an object detection system and, more particularly, to an object detection system having an interference avoidance strategy.

BACKGROUND

Machines such as off-highway haul trucks, motor graders, snow plows, and other types of heavy equipment are used to perform a variety of tasks. Some of these tasks involve carrying or pushing large, awkward, loose, and heavy loads up steep inclines or along rough or poorly marked haul roads. Because of the size and momentum of the machines and because of poor visibility, these tasks can be difficult for a human operator alone to complete effectively.

To help guide the machines safely and efficiently along the haul roads, some machines are equipped with sensors, for example, RADAR sensors, SONAR sensors, LIDAR sensors, IR and non-IR cameras, and other similar sensors. These sensors generate signals used to create terrain maps of travel areas in front of the machines, the maps showing roadway surfaces and locations of different objects. The sensors are often associated with a visual display and/or a guidance system of the machine such that control over machine maneuvering may be enhanced or even automated with the terrain maps.

An exemplary object detection system is described in U.S. Pat. No. 5,210,586 (the '586 patent) issued to Grage et al. on May 11, 1993. Specifically, the '586 patent describes an arrangement for recognizing objects for pilots of low-flying aircraft. The arrangement includes an array of semiconductor laser diodes and a receiver that work together according to the laser radar principle. The laser diodes operate as a pulsed radiation source to scan a field of view of the aircraft. The receiver receives the pulsed radiation and generates a corresponding course grid of an environment of the aircraft, the grid having a pattern established like a mesh network that is displayed inside a cockpit of the aircraft. An operator of the aircraft may then use the displayed network to recognize and avoid objects such as overhead lines, wire cables, and pylons.

Although the arrangement of the '586 patent may help to improve machine control, it may be less than optimal. In particular, the course grid produced by the arrangement may provide insufficient focus on critical areas in a machine's travel path. In addition, the arrangement may not be applicable to operations where other similarly-equipped machines may be operating nearby.

The disclosed object detection system is directed to overcoming one or more of the problems set forth above and/or other problems of the prior art.

SUMMARY

In one aspect, the present disclosure is directed to an object detection system for a first machine. The object detection system may include at least one transmitter configured to generate a laser beam directed onto a ground surface in proximity to the first machine, and a receiver configured to detect the laser beam and generate a corresponding signal. The object detection system may also include a controller in communication with the at least one transmitter and the receiver. The controller may be configured to generate an electronic terrain map based on the signal. The controller may also be configured to make a determination that a second machine is operating within a range of the first machine, and to adjust operation of the at least one transmitter and receiver based on the determination to reduce undesired interactions caused by operation of the second machine.

In another aspect, the present disclosure is directed to a computer readable medium having computer executable instructions for performing a method of object detection for a first mobile machine. The method may include directing at least a first laser beam onto a ground surface, and detecting the at least a first laser beam and responsively generating an electronic terrain map based on the detection. The method may also include making a determination that a second mobile machine is operating within a range of the first mobile machine, and adjusting characteristics of the at least a first laser beam based on the determination to reduce undesired interactions caused by the second mobile machine.

DETAILED DESCRIPTION

Figure 1:
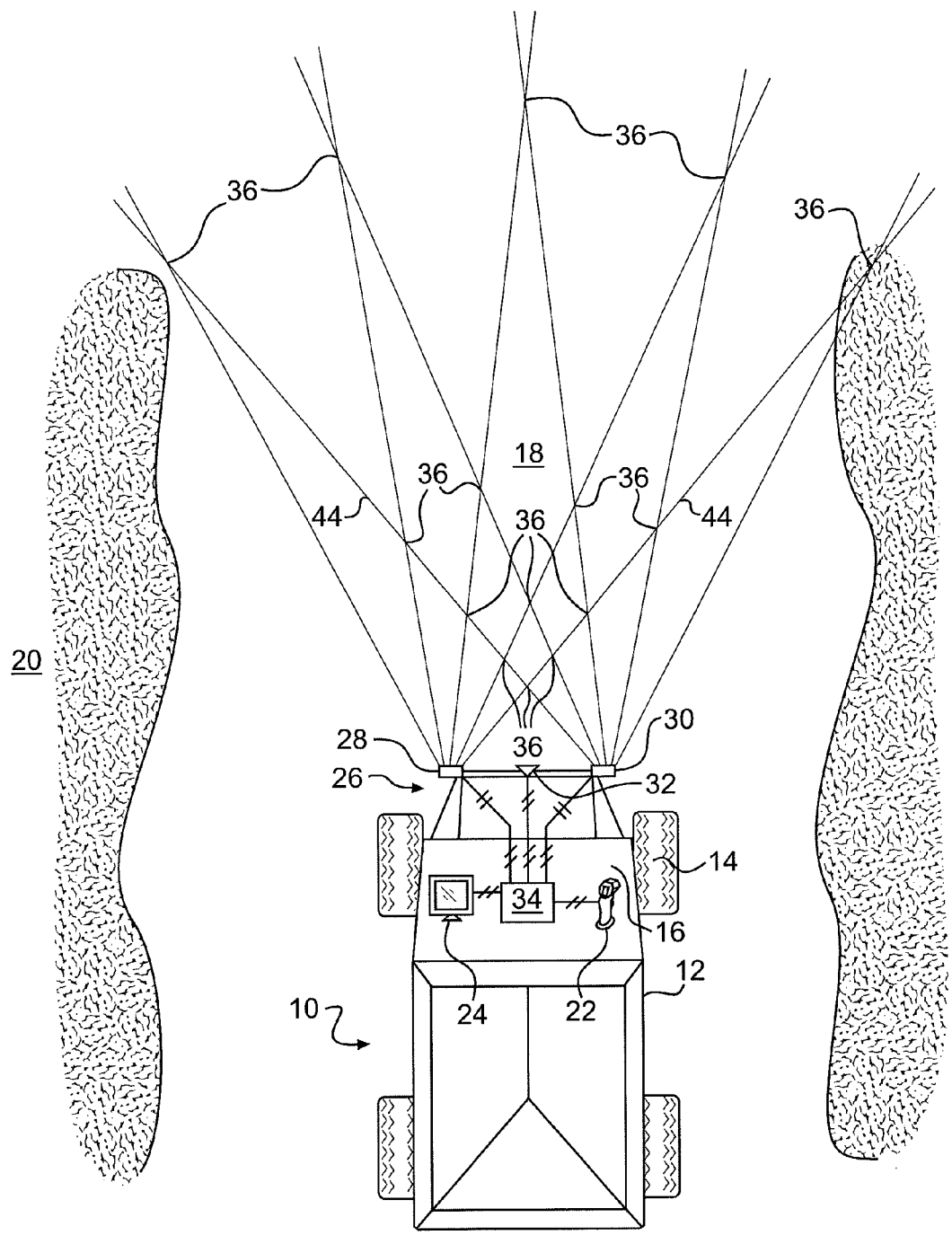
FIG. 1 is a pictorial illustration of an exemplary disclosed object detection system.

FIG. 1 illustrates an exemplary machine 10 having multiple systems and components that cooperate to accomplish a task. The tasks performed by machine 10 may be associated with a particular industry such as mining, construction, farming, transportation, or any other industry known in the art. For example, machine 10 may embody a mobile machine such as the haul truck depicted in FIG. 1, a wheel-loader, a dozer, or another type of mobile machine. Machine 10 may include a body 12 supported by one or more traction devices 14, and a control station 16 connected to body 12 for control of traction devices 14. Machine 10 may be a self-directed machine configured to autonomously traverse a ground surface 18 of a worksite 20, a manned machine configured to traverse ground surface 18 under the control of an operator, or a hybrid machine configured to perform some functions autonomously and other functions under the control of an operator.

Control station 16 may include devices that receive input from a machine operator indicative of desired machine maneuvering and that display operational parameters of machine 10. Specifically, control station 16 may include one or more operator interface devices 22 and a display 24 located proximate an operator seat (not shown). Operator interface devices 22 may initiate movement of machine 10 by producing displacement signals that are indicative of desired machine maneuvering. In one embodiment, operator interface device 22 may include a joystick or a steering wheel. As an operator moves interface device 22, the operator may affect a corresponding machine steering movement in a desired direction away from a current heading. It is contemplated that an operator interface device other than a joystick or steering wheel such as, for example, a lever, a pedal, and other devices known in the art, may additionally or alternatively be provided within control station 16 for movement control of machine 10, if desired. Display 24 may be configured to show an electronic terrain map of worksite 20 and may embody, for example, a liquid crystal display (LCD), a plasma display, or another type of display known in the art.

Machine 10 may be equipped with an object detection system 26 used for terrain display, collision avoidance, autonomous guidance and/or other similar purposes. Object detection system 26 may include, among other things, a first array of laser beam transmitters (first array) 28, a second array of laser beam transmitters (second array) 30, a receiver 32, and a controller 34. First and second arrays 28, 30 may be located apart from each other on body 12 of machine 10, preferably in a location corresponding to a most common travel direction. For example, FIG. 1 depicts first and second arrays 28, 30 located on a front end of machine 10, at left and right corners thereof, respectively. It is contemplated, however, that first and second arrays 28, 30 may be positioned at any other location on machine 10, as desired. It is further contemplated that additional arrays of laser beam transmitters may also be utilized. Receiver 32 may be positioned at any convenient location on machine 10 where receiver 32 may detect intersections 36 of grid lines 44 generated by first and second arrays 28, 30. Controller 34 may be configured to control operations of first and second arrays 28, 30 and/or of receiver 32 based on various input, and to show results of the operations on display 24.

Figure 2:
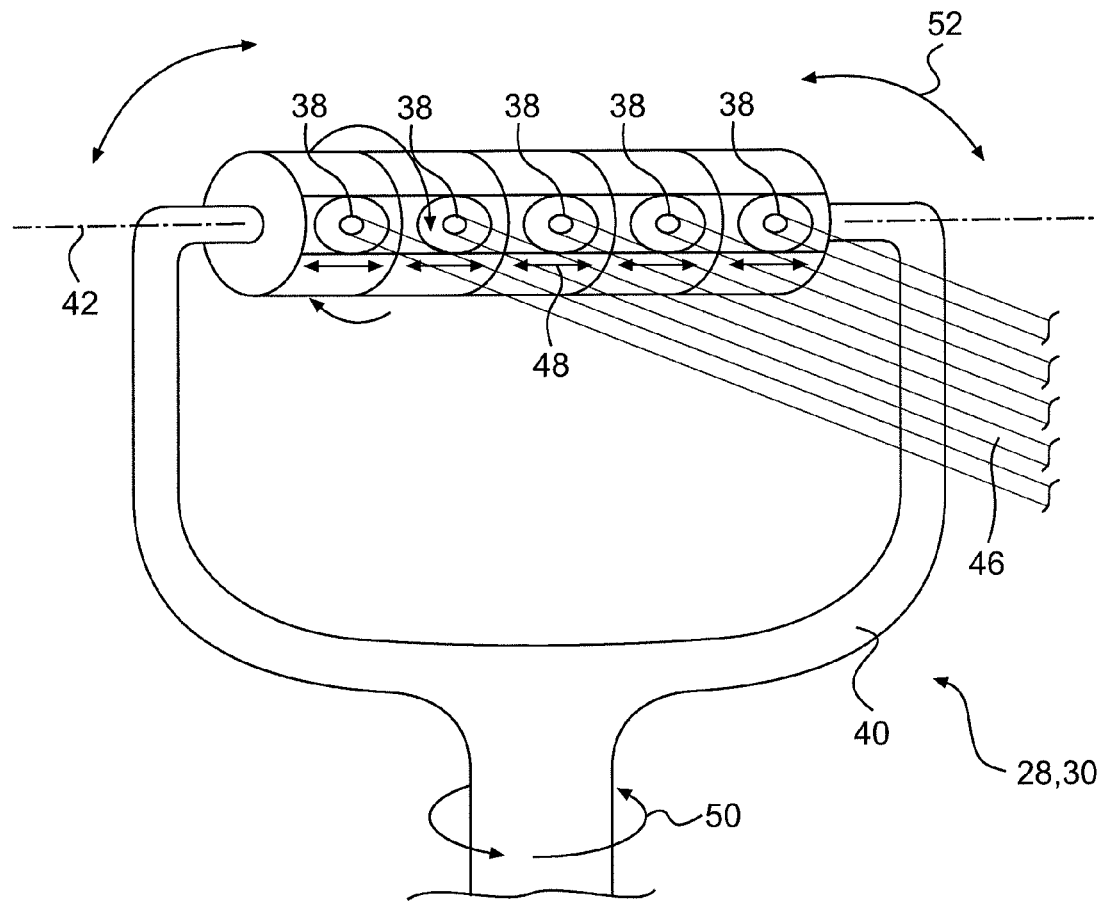
FIG. 2 is a pictorial illustration of a portion of the object detection system of FIG. 1.

As illustrated in FIG. 2, each of first and second arrays 28, 30 may include a plurality of individual laser beam transmitters (transmitters) 38 arranged together in a common mount 40. In the disclosed embodiment, each of first and second arrays 28, 30 includes five transmitters 38. It is contemplated, however, that any number of transmitters 38 may be utilized.

Each transmitter 38 may be configured to generate a corresponding laser beam 46 directed toward ground surface 18 at worksite 20 to form grid lines 44 (referring to FIG. 1). When each laser beam 46 contacts ground surface 18, a point of laser radiation may be observed. Each transmitter 38 may be supported by mount 40 in a manner that allows rotation of transmitter 38 about an axis 42 such that the point of laser radiation may flash across ground surface 18 and thereby form a pulsating grid line 44. In this manner, five grid lines 44 may be produced by first array 28 that fan out from first array 28 in a travel direction of machine 10, each grid line 44 spaced from adjacent grid lines 44 by specific distances and/or angles. Similarly, five grid lines 44 may be produced by second array 30 that fan out from second array 30 in a travel direction of machine 10, each grid line 44 spaced apart from adjacent grid lines 44 by specific distances and/or angles. Grid lines 44 generated by first array 28 may intersect with grid lines 44 generated by second array 30 to form intersections 36. The number of visible intersections 36 may depend on the number of grid lines 44, an orientation of mounts 40, and an available open space in the grid line directions. In the disclosed example, grid lines 44 generated by first or second arrays 28, 30 may be generally non-parallel with other grid lines 44 from the same array, and generally non-perpendicular to grid lines 44 of the other array. This angular arrangement may enhance intersection detection and recognition by receiver 32, as the angles between grid lines 44 become somewhat unique to particular intersections 36.

Transmitters 38 may be supported by mount 40 to move in a number of different ways to adjust a focus of grid lines 44 on ground surface 18. For example, an angle and/or spacing between individual transmitters 38 within a single array (first or second arrays 28, 30) may be selectively and independently adjusted in a direction represented by an arrow 48 to increase or decrease the distance and/or angle between adjacent grid lines 44. In another example, a portion of mount 40 supporting first or second arrays 28, 30 may be rotated in a direction represented by an arrow 50 (i.e., in a horizontal plane generally aligned with transmitters 38 and in a direction generally transverse to a direction of grid lines 44) to thereby shift left and right a direction of grid lines 44 relative to a travel direction of machine 10. In yet another example, a portion of mount 40 supporting first or second arrays 28, 30 may be rotated in a direction represented by an arrow 52 (i.e., in a vertical plane generally aligned with transmitters 38 and in a direction generally transverse to a direction of grid lines 44) to thereby reorient grid lines 44 relative to each other in both horizontal and vertical directions while maintaining the same general length-wise direction of grid lines 44. The rotation of transmitters 38 in the direction of arrow 52 may cause a similar rotation of the corresponding grid lines 44 about a common end at first or second arrays 28, 30. It is contemplated that mount 40 may utilize conventional components known in the art, for example linear and rotary actuators and motors, arranged in any manner to accomplish the exemplary movements of transmitters 38 described above.

When moving transmitters 38 of one or both of first and second arrays 28, 30 in the direction of arrows 48-52, a density of intersections 36 at a particular location on ground surface 18 may change. In one example, intersections 36 may remain in the same general location, but become closer together or further apart as a distance and/or an angle between transmitters 38 is adjusted in the direction of arrows 48. In another example (shown in FIG. 3), the general location of intersections 36 may move to the left or right of a travel path of machine 10 and closer to or further away from machine 10 as transmitters 38 are rotated in the directions of arrows 50 and 52, respectively. It is further contemplated that particular transmitters 38 within first or second arrays 28, 30 may be selectively turned on or off to increase or decrease a number of grid lines 44 and thereby vary a density of intersections 36, if desired.

Receiver 32 (referring to FIG. 1) may be configured to detect intersections 36. Specifically, receiver 32 may embody a detector or array of detectors mounted at a known position onboard machine 10 and configured to detect characteristics of the laser radiation produced by transmitters 38 at intersections 36. Based on detected characteristics of intersections 36, receiver 32 may be configured to generate a corresponding signal used to determine a location of intersections 36 on ground surface 18 relative to the known position of receiver 32 onboard machine 10. This location information may be provided to controller 34 for further processing.

Controller 34 may include means for receiving location information from receiver 32 and for responsively generating the terrain map of worksite 20. For example, controller 34 may include a memory, a secondary storage device, a clock, and one or more processors that cooperate to accomplish a task consistent with the present disclosure. Numerous commercially available microprocessors can be configured to perform the functions of controller 34. It should be appreciated that controller 34 could readily embody a computer system capable of controlling numerous other functions. Various other known circuits may be associated with controller 34, including signal-conditioning circuitry, communication circuitry, driver circuitry, and other appropriate circuitry. It should also be appreciated that controller 34 may include one or more of an application-specific integrated circuit (ASIC), a field-programmable gate array (FPGA), a computer system, and a logic circuit configured to allow controller 34 to function in accordance with the present disclosure. Thus, the memory of controller 34 may embody, for example, the flash memory of an ASIC, flip-flops in an FPGA, the random access memory of a computer system, or a memory contained in a logic circuit. Controller 34 may be further communicatively coupled with an external computer system, instead of or in addition to including an onboard computer system.

Controller 34 may be configured to receive signals from receiver 32 and responsively generate the electronic terrain map shown on display 24 within control station 16. The electronic terrain map may include data corresponding to the landscape of worksite 20 or, alternatively, external geometry and/or features of an obstacle at worksite 20. For example, the electronic terrain map may include general contours of ground surface 18 with respect to a location of machine 10. The contours may be generated by fitting lines and/or curves through detected locations of intersections 36. Additionally or alternatively, the electronic terrain map may include data points corresponding to the detected locations of intersection 36, the data points used to represent the obstacles at worksite 20. In either situation, a greater number of closely spaced intersections 36 (i.e., a greater density of intersections 36) may result in a higher resolution of terrain map. Controller 34 may store the electronic terrain map in memory as, for example, a 2-dimensional or 3-dimensional grid, or in any other manner known in the art. Thus, the electronic terrain map, including the location of machine 10, may be represented as data in the memory of controller 34. It is contemplated that the electronic terrain map may alternatively be embodied as a database accessible by controller 34, if desired.

Figure 3:
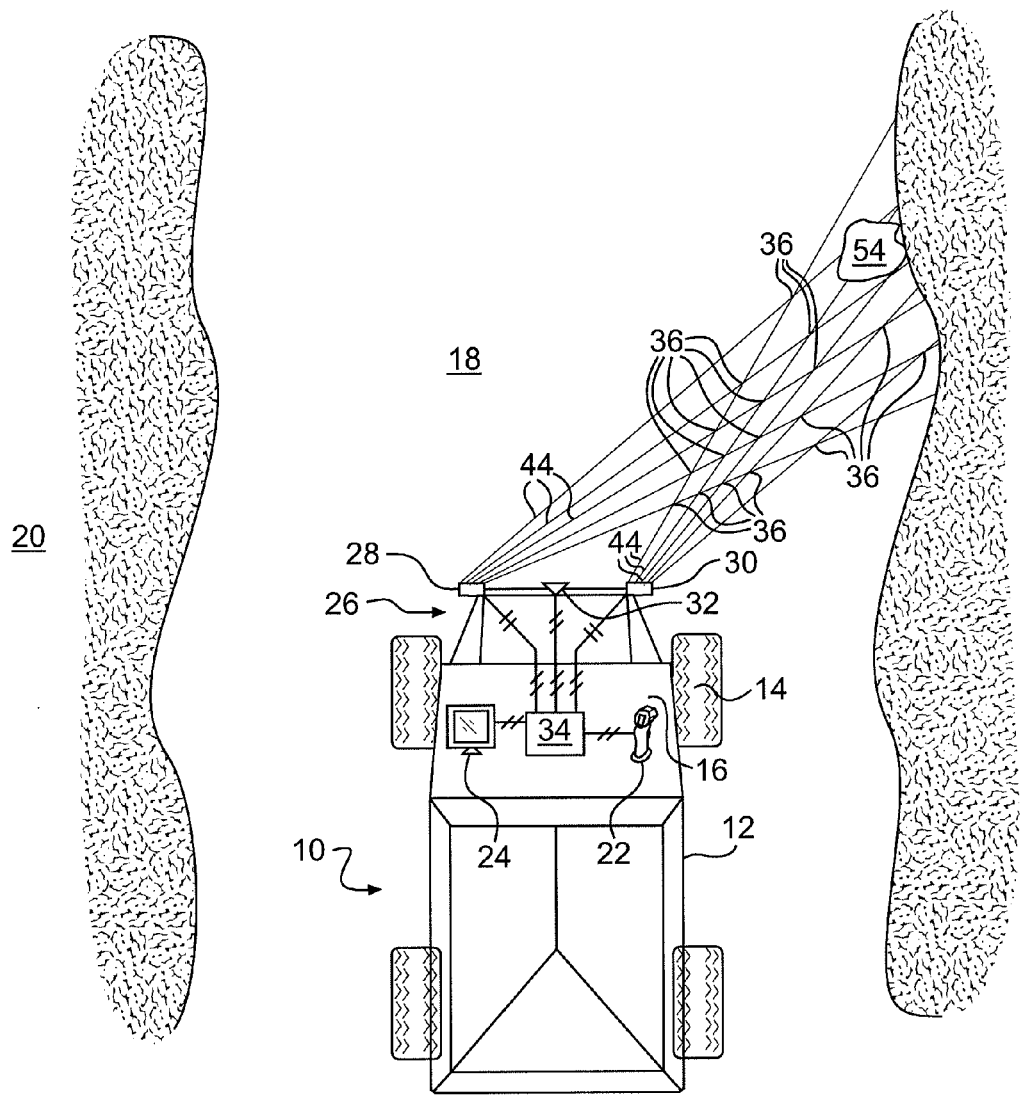
FIG. 3 is a pictorial illustration of an exemplary operation of the object detection system of FIG. 1.
Figure 4:
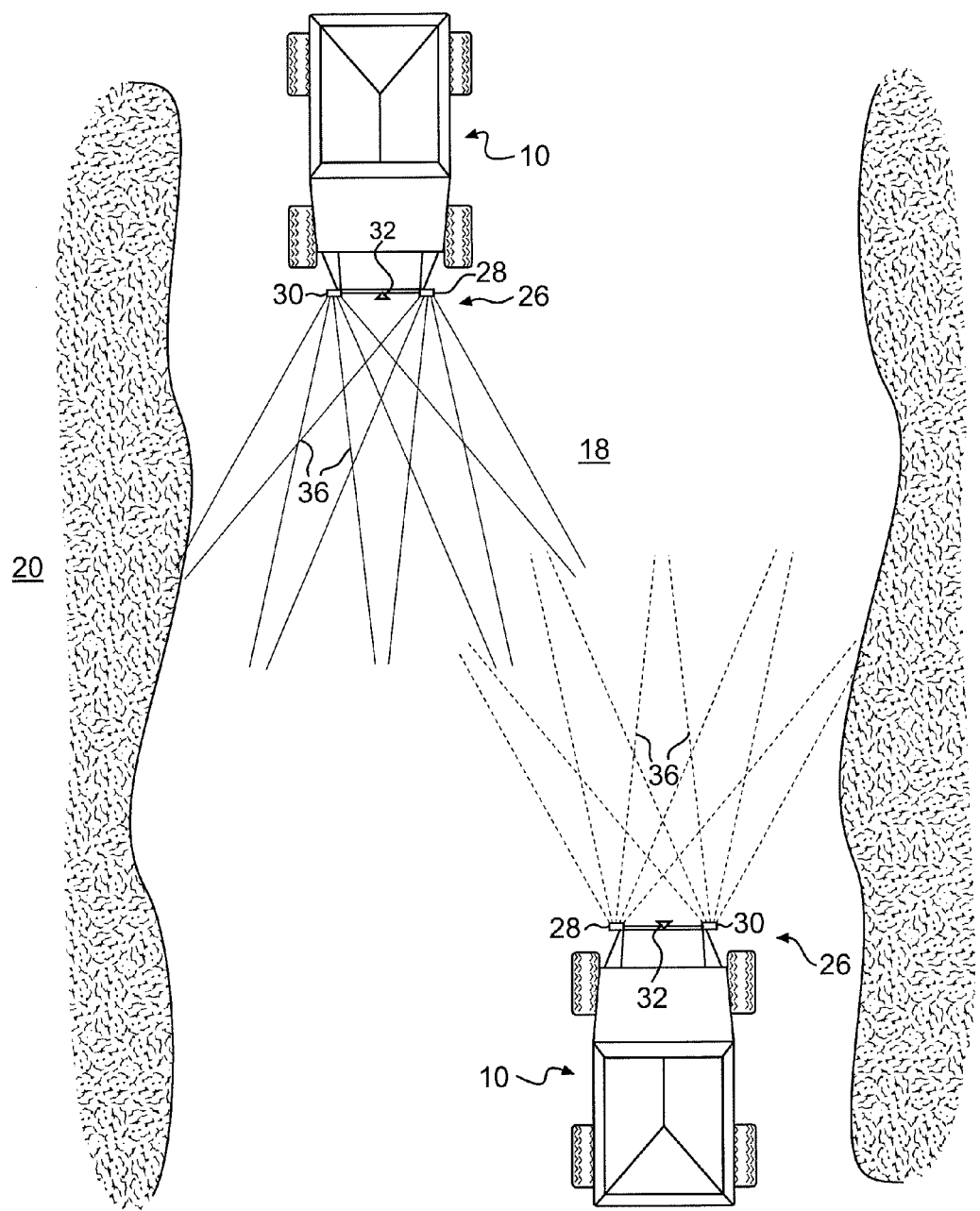
FIG. 4 is another pictorial illustration an exemplary operation of the object detection system of FIG. 1. pedals more like joysticks and displays.

FIGS. 3 and 4 illustrate exemplary operations of object detection system 26. FIGS. 3 and 4 will be discussed in more detail in the following section to further illustrate the disclosed concepts.

Industrial Applicability

The disclosed object detection system may be applicable to any mobile machine that benefits from electronic terrain mapping. The disclosed object detection system may provide for enhanced resolution and/or detection focusing by allowing for selective transmitter array movement. The disclosed object detection system may also reduce the likelihood of error when multiple mobile machines are operating in close proximity to each other. Operation of object detection system 26 will now be described.

Controller 34 may be configured to execute instructions stored on computer readable medium to perform a method of object detection for machine 10. In particular, controller 34 may execute instructions to selectively cause movement of first and second arrays 28, 30 that changes the density of intersections 36 at a particular location on ground surface 18. That is, controller 34 may be in communication with the actuation components of mounts 40 and/or first and second arrays 28 and configured to selectively cause transmitters 38 to move in the direction of arrow 48 and turn on or off, and/or to cause mount 40 to rotate first and/or second arrays 28, 30 in the directions of arrows 50 and 52. Controller 34 may initiate the change in intersection density based on an operator request, a steering of machine 10, a recognized object within the travel path of machine 10, a detected aberration in the terrain map of worksite 20, and/or based on other input known in the art. By changing a density of intersections 26 at a particular location on ground surface 18, a resulting resolution and/or focus of the electronic terrain map may be modified.

FIG. 3 illustrates an example of an intersection density change. In this example, after an initial scan of ground surface 18, it was determined that an object 54 may be located forward and to the right of machine 10, as viewed from an operator's perspective. Because object 54 may lie in or near a travel path of machine 10, it may be important to know as much information about object 54 as possible. Accordingly, an increased resolution at the location of object 54 on the terrain map may be requested. The request for increased resolution may be initiated, for example, by the operator of machine 10 after viewing on display 24 the electronic terrain map, or automatically by controller 34 in response to detection and recognition of object 54 as part of an autonomous guidance program. In either situation, controller 34 may trigger movement of transmitters 38 in the direction of arrows 48 and/or 50 such that grid lines 44 shift to the right and move intersections 36 into the vicinity of object 54. This movement may result in a greater number of closely-spaced intersections 36 near object 54. Based on the location information subsequently provided by receiver 32, controller 34 may be able to generate a higher resolution representation in the electronic terrain map at the location of object 54. It is contemplated that the same or a similar intersection density change could alternatively be triggered by controller 34 based on an aberration in the terrain map at a particular location, or based on desired or actual machine steering in a particular direction away from a current heading (as signaled by interface device 22) such that resolution may be improved in an intended travel path of machine 10, if desired. It is also contemplated that other triggers for intersection density changes may be possible.

As shown in FIG. 4, it may be possible for multiple machines 10 to be operating at worksite 20 at the same time, each of machines 10 being equipped with object detection system 26. In this situation, with each object detection system 26 generating intersections 36, it may be possible for receivers 32 of a first machine 10 to detect intersections 36 generated by a second machine 10. When receivers 32 detect intersections 36 generated by another machine 10, the corresponding controllers 34 may become confused and generate errors in the display of the electronic terrain map. For example, with both first and second arrays 28, 32 generating five laser beams 46 in the disclosed embodiment, a maximum of 25 intersections may be produced and, accordingly, receiver 32 may be programmed to detect, at most, only 25 intersections 36. In addition, based on a current orientation and/or position of first and second arrays 28, 32, receiver 32 may be programmed to look for intersections 36 in particular regions. However, if scan areas of multiple machines 10 were to overlap, more than 25 intersections could be observed by a single receiver 32, and possibly observed in unexpected locations. When this occurs, signals subsequently generated by receiver 32 may represent bad data that could cause errors in the electronic terrain map generated by controller 34. Accordingly, first and second arrays 28, 30 may be selectively controlled to generate unique intersections 36 that are only detectable by the corresponding receivers 32 in order to help avoid unintended interactions between machines 10.

In one example, controller 34 may make a determination that machine 10 is operating in a vicinity of another machine (i.e., operating within a range where receivers 34 may detect incorrect intersections 36) and execute instructions to responsively change a characteristic of laser beams 46 (referring to FIG. 2) generated by transmitters 38. For example, when machine 10 is operating in a first region of worksite 20 by itself, controller 34 may cause first and second arrays 28, 30 to generate laser beams 46 having a default wavelength corresponding to the color red. Then, when machine 10 is operating in a second region of worksite 20 in the vicinity of another machine, controller 34 may cause the corresponding first and second arrays 28, 30 to change wavelengths and generate laser beams 46 corresponding to an alternative color such as green. At this same time, controller 34 may execute instructions to adjust operation of receiver 32 to detect and recognize only grid lines 44 generated by green laser beams 46. In this manner, the resulting intersections 36 may have characteristics that make them detectable only by their corresponding receivers 32.

In another example, controller 34 may execute instructions to cause and/or adjust the pulsation of laser beams 46 when machine 10 is operating within a range of another machine. For example, when machine 10 is operating in a first region of worksite 20 by itself, controller 34 may cause first and second arrays 28, 30 to rotate and pulse laser beams 46 across ground surface 18 at a default frequency. In this situation, receiver 32 may be programmed to detect only intersections 36 that pulse at the default frequency. Then, when machine 10 is operating in a second region of worksite 20 in the vicinity of another machine, controller 34 may cause the corresponding first and second arrays 28, 30 to rotate and pulse laser beams 46 across ground surface 18 at an alternative frequency detectable only by the corresponding receiver 32.

It is contemplated that controllers 34 of different machines 10 may be assigned unique wavelengths and/or pulsation frequencies for use when operating near other machines and/or at common locations. For example, a specific haul truck may be assigned the alternative laser wavelength corresponding with the color red and/or a predetermined faster pulsation frequency when operating at a common dump location of worksite 20, while a specific wheel loader may be assigned the alternative laser wavelength corresponding with the color green and/or a predetermined slower pulsation frequency for operation at the dump location. In one embodiment, the default and alternative laser wavelengths and/or pulsation frequencies may be communicated between controllers 34 when different machines 10 operate near each other.

The changing between laser between laser beam characteristics may be automatically triggered based on a distance of one machine 10 to another. Specifically, when controller 34 determines that two machines 10 are less than a minimum threshold distance apart from each other, for example about 200 yards, controllers 34 of the respective machines 10 may execute instructions to automatically trigger their respective transmitters 38 and receivers 32 to begin operating at the alternative wavelength and/or pulsation frequency. At this same time a communication of the change in laser wavelengths and/or pulsation frequencies may be directed between machines 10 to help ensure that both machines 10 do not make the same changes in laser beam characteristics. It is contemplated that the relative distances between machines 10 may be monitored via object detection system 26, via a location device such as a GPS unit, via communications between machines 10 and/or a worksite controller, via signal pulse detection (i.e., detection of signal pulses generated at each individual machine), or in another manner known in the art.

The changing between laser beam characteristics may alternatively be triggered manually. In particular, when the operator of a first machine 10 observes another machine 10 operating in close proximity, the operator may manually request that transmitters 38 and receivers 32 begin operating at the alternative wavelength and/or pulsation frequency. Controller 34 may then implement the necessary adjustments based on the operator request.

It is contemplated that the adjustments made to the wavelength and/or pulsation frequency of laser beams 46 may be stored in and selected for use from the memory of controller 34. For example, controller 34 may have stored in memory one or more maps relating distances between machines 10, types of machines, specific locations at worksite 20, machine identifications, or other similar characteristics to different laser beam wavelengths and/or pulsation frequencies. In another example, the wavelength and/or pulsation frequency of laser beam 46 may simply be adjusted until different than those of another nearby machine, as measured by receiver 32 and/or communicated from the other machine.

Several benefits may be associated with the disclosed object detection system. For example, the ability to selectively increase a density of detectable laser grid intersections at a particular location may help improve object detection and terrain map resolution. In addition, the ability to adjust operation based on a proximity of other similar object detections systems may help to avoid undesired interactions and thereby reduce the likelihood of errors in the generated electronic terrain maps.

It will be apparent to those skilled in the art that various modifications and variations can be made to the object detection system of the present disclosure. Other embodiments of the object detection system will be apparent to those skilled in the art from consideration of the specification and practice of the system disclosed herein. For example, although grid lines 44 have been described as pulsating lines generated by rotating point-type transmitters 38, it is contemplated that grid lines 44 may alternatively be constant and generated by stationary line-type transmitters 38, if desired. In this configuration, first and second arrays 38, 30 may be caused to selectively pulse laser radiation at a desired frequency simply by turning transmitters 38 on and off. In addition, although wavelength and frequency adjustments to laser beam 46 have been discussed above, it is contemplated that other adjustments may also or alternatively be implemented. For example, it is contemplated that operation of transmitters 38 and/or receivers 32 of different machines may scheduled (e.g., turned on and off at arranged times) during operation near each other so as to not interfere. Further, although detection of intersections 36 has been described through this disclosure, it is contemplated that receiver 32 may alternatively or additionally be configured to detect grid lines 44, if desired, the electronic terrain map and control of object detection system 26 then being based on the location of grid lines 44 instead of or in addition to the location of intersections 36. It is intended that the specification and examples be considered as exemplary only, with a true scope of the disclosure being indicated by the following claims and their equivalents.

What is claimed is:

1. An object detection system for a first machine, comprising:
   at least one transmitter configured to generate a laser beam directed onto a ground surface in proximity to the first machine;
   a receiver configured to detect the laser beam and generate a corresponding signal; and
   a controller in communication with the at least one transmitter and the receiver, the controller being configured to:
   generate an electronic terrain map based on the signal;
   make a determination that a second machine is operating within a range of the first machine; and
   adjust operation of the at least one transmitter and receiver based on the determination to avoid errors in the electronic terrain map caused by interaction with a laser beam originating from the second machine.

2. The object detection system of claim 1, wherein the controller is configured to adjust operation by changing a wavelength of the laser beam generated by the at least one transmitter and detected by the receiver.

3. The object detection system of claim 1, wherein the controller is configured to adjust operation by changing a pulsation frequency of the laser beam generated by the at least one transmitter and detected by the receiver.

4. The object detection system of claim 1, wherein the controller is configured to automatically adjust operation of the at least one transmitter and receiver when the second machine is within a threshold distance of the first machine.

5. The object detection system of claim 4, wherein the controller is configured to communicate to the second machine how operation of the at least one transmitter and receiver is adjusted.

6. The object detection system of claim 4, wherein the controller is configured to adjust operation of the at least one transmitter and receiver based on a request from an operator of the first machine.

7. The object detection system of claim 1, wherein the controller includes stored in memory a map relating adjustments of the at least one transmitter and the receiver to characteristics of at least one of the first and second machines.

8. A non-transitory computer readable medium having computer executable instructions for performing a method of object detection for a first mobile machine, the method comprising:
   directing at least a first laser beam and responsively generating an electronic terrain map based on the election;
   making a determination that a second mobile machine is operating within a range of the first mobile machine; and
   adjusting characteristics of the at least a first laser beam based on the determination to reduce undesired interactions with a second laser beam originating from caused by the second mobile machine.

9. The computer readable medium of claim 8, wherein adjusting includes adjusting a wavelength of the at least a first laser beam.

10. The computer readable medium of claim 8, wherein adjusting includes adjusting a pulsation frequency of the at least a first laser beam.

11. The computer readable medium of claim 8, wherein adjusting includes automatically adjusting characteristics of the at least a first laser beam when the second mobile machine is within a threshold distance of the first mobile machine.

12. The computer readable medium of claim 11, wherein the method further includes communicating with the second mobile machine how characteristics of the at least a first laser beam were adjusted.

13. The computer readable medium of claim 11, wherein:
   the method further includes receiving an operator request to adjust the characteristics of the at least a first laser beam; and
   the adjusting is itiated based on the operator request.

* * * * *